US011595465B1

(12) United States Patent
Adnan et al.

(10) Patent No.: US 11,595,465 B1
(45) Date of Patent: Feb. 28, 2023

(54) SYSTEMS AND METHODS FOR SELECTIVELY OBTAINING A FILE VIA A DIRECT FILE TRANSFER OR AN INDIRECT FILE TRANSFER

(71) Applicant: Verizon Patent and Licensing Inc., Basking Ridge, NJ (US)

(72) Inventors: Khalid Adnan, Lincroft, NJ (US); Jun Yuan, Cranbury, NJ (US); Carlos J. Torres, East Brunswick, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/449,373

(22) Filed: Sep. 29, 2021

(51) Int. Cl.
*H04L 67/06* (2022.01)
*H04L 67/147* (2022.01)
*H04L 67/303* (2022.01)
*H04L 67/1097* (2022.01)

(52) U.S. Cl.
CPC .......... *H04L 67/06* (2013.01); *H04L 67/1097* (2013.01); *H04L 67/147* (2013.01); *H04L 67/303* (2013.01)

(58) Field of Classification Search
CPC ... H04L 67/06; H04L 67/1097; H04L 67/147; H04L 67/303
See application file for complete search history.

(56) References Cited

U.S. PATENT DOCUMENTS

| | | | |
|---|---|---|---|
| 10,742,715 B1 | 8/2020 | Adnan et al. | |
| 11,196,797 B2 * | 12/2021 | De Angelis | ........... H04L 45/745 |
| 2004/0003114 A1 * | 1/2004 | Adamczyk | ........ H04M 3/53325 |
| | | | 709/245 |
| 2007/0180485 A1 * | 8/2007 | Dua | ........................ H04N 5/76 |
| | | | 725/74 |
| 2007/0226295 A1 * | 9/2007 | Haruna | ................... G06F 16/38 |
| | | | 709/204 |
| 2020/0236083 A1 * | 7/2020 | Johns | .................... H04L 67/568 |

* cited by examiner

*Primary Examiner* — Viet D Vu

(57) ABSTRACT

In some implementations, a device may receive file location information identifying a file to be transferred to a user device associated with the first network provider, wherein the file location information identifies a domain name associated with a second network provider. The device may provide, based on the file location information, a request to obtain one or more records associated with the domain name. The device may receive the one or more records based on the request. The device may selectively obtain, based on the one or more records, the file from a first content device associated with the second network provider or from a second content device associated with a third-party provider. The device may provide the file to the user device.

20 Claims, 8 Drawing Sheets

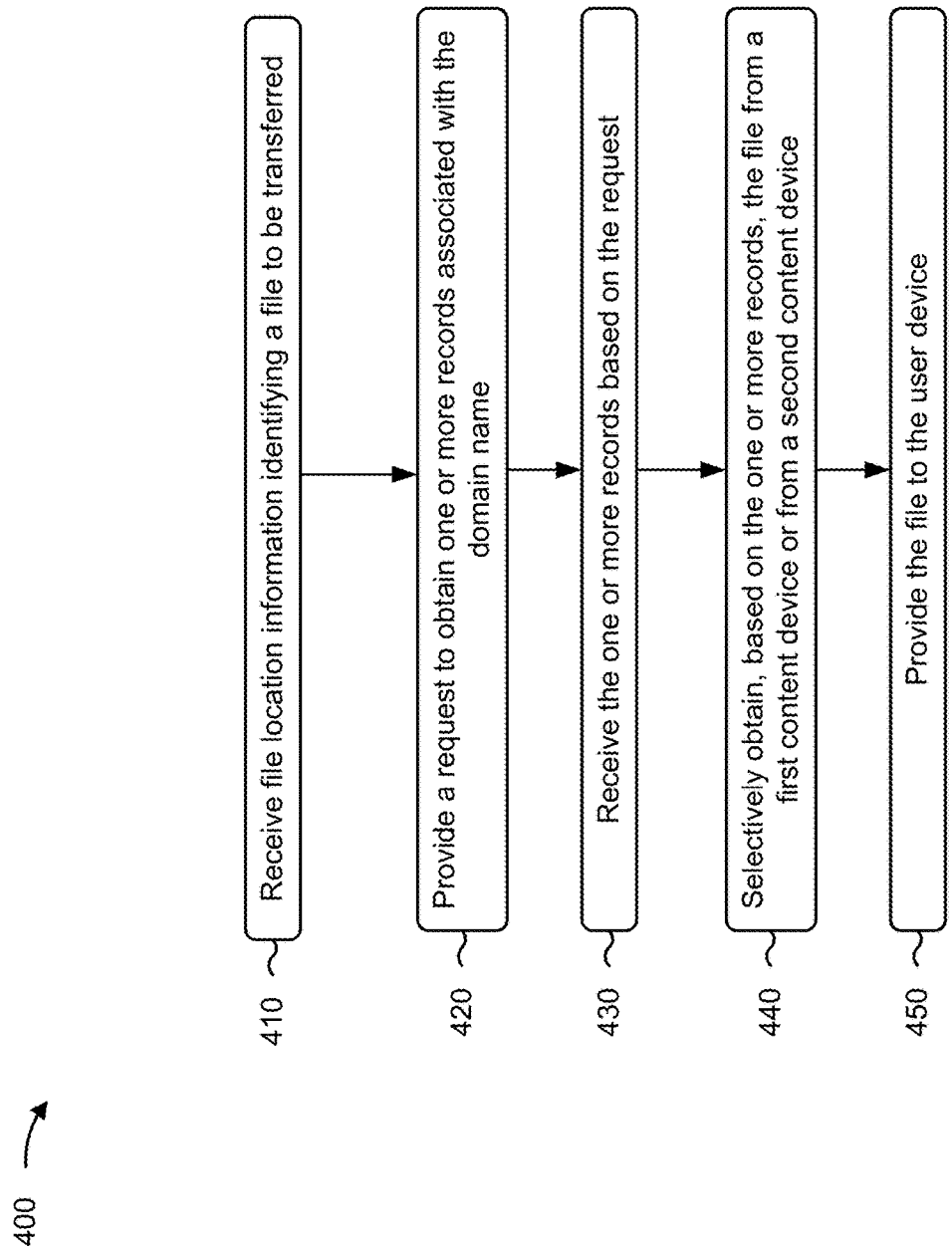

US 11,595,465 B1

SYSTEMS AND METHODS FOR SELECTIVELY OBTAINING A FILE VIA A DIRECT FILE TRANSFER OR AN INDIRECT FILE TRANSFER

BACKGROUND

Rich communication services (RCS) is a communication protocol between mobile devices and carriers. RCS provides text-message capabilities similar to short message service (SMS) messaging. Additionally, RCS may provide various enhancements to SMS messaging, such as read receipts, multimedia (e.g., audio, video, picture, etc.) messaging, attachments, customized interactive objects, location sharing, group messaging sessions, among other examples.

BRIEF DESCRIPTION OF THE DRAWINGS

FIG. 4 is a flowchart of an example process relating to selectively obtaining a file via a direct file transfer or an indirect file transfer.

DETAILED DESCRIPTION OF PREFERRED EMBODIMENTS

Figure 1A:
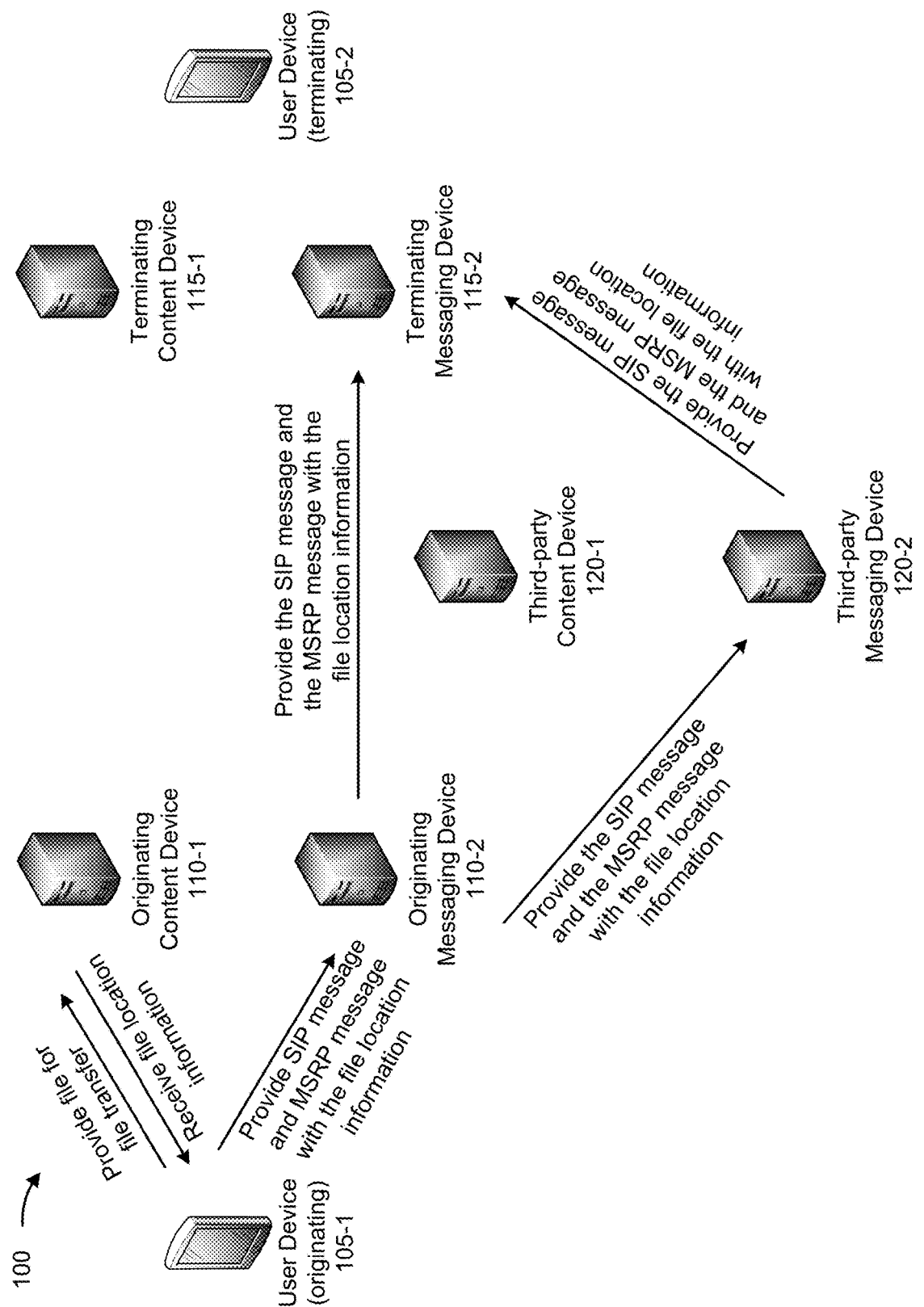
FIGS. 1A-1E are diagrams of an example associated with selectively obtaining a file via a direct file transfer or an indirect file transfer.

The following detailed description of example implementations refers to the accompanying drawings. The same reference numbers in different drawings may identify the same or similar elements.

A file may be transferred by way of a direct network-to-network interface (NNI) file transfer or by a way of an indirect NNI file transfer. The indirect NNI file transfer may be performed via a third-party provider acting as a Rich Communication Services (RCS) service hub (e.g., a third-party content device associated with the third-party provider). As part of the process for transferring the file, a content device of an originating network provider generates a Uniform Resource Locator (URL) that identifies a location of the file.

When generating the URL, the content device determines whether the file will be located in the content device or located in the third-party content device. As a result, the content device generates different URLs depending on whether the file is to be transferred via the direct NNI file transfer from the content device or the indirect NNI file transfer from the third-party content device. Generating different URLs in this manner wastes computing resources, network resources, and other resources.

The present disclosure is directed to using file location records to enable a content device of an originating network provider to generate a single URL for a file to be transferred, irrespective of a location of the file. In some embodiments, the file location records may include Name Authority Pointer (NAPTR) records. For example, a device (e.g., a content device), of a terminating network provider, may be configured to receive the URL and determine that a domain name, of the URL, is different than a domain name associated with the terminating network provider. The device (of the terminating network provider) does not need to configure the URL. Rather, the device uses the same URL which was initially communicated from a device of the originating network provider. A file location record (e.g., a NAPTR record), when used by the device (e.g., the terminating network provider) provides the location of the URL, as either being on a content device of the originating network provider (e.g., an originating network server) or a content device of a hub service provider network.

Based on that determination, the device may determine that file location records, associated with the domain name of the URL, are to be obtained in order to determine whether the file is to be obtained from the content device of the originating network provider or from a content device of a third-party provider (e.g., via the direct NNI file transfer or via the indirect NNI file transfer). The file location records may include (e.g., in service fields) information indicating that the file is to be obtained via the direct NNI file transfer or via the indirect NNI file transfer. In some implementations, the file location records may be sorted based on order values of the file location records and/or based on preference values of the file location records. In some implementations, the file location records may be sorted in this manner to indicate an order of a file transfer method (e.g., out of the direct NNI file transfer and the indirect NNI file transfer) to use to obtain the file.

Based on the information included in the file location records, the device (of the terminating network provider) may determine whether the file is to be obtained via the direct NNI file transfer or via the indirect NNI file transfer. Using the file location records in this manner preserves computing resources, network resources, and other resources that would have otherwise been used by the content device (of the originating network provider) to generate different URLs for different locations of the file.

FIGS. 1A-1E are diagrams of an example associated with selectively obtaining a file via a direct file transfer or an indirect file transfer. As shown in FIG. 1A, example 100 includes an originating user device 105-1, a terminating user device 105-2, an originating content device 110-1, an originating messaging device 110-2, a terminating content device 115-1, a terminating messaging device 115-2, a third-party content device 120-1, and a third-party messaging device 120-2. Terminating user device 105-2, terminating content device 115-1, and terminating messaging device 115-2 may be associated with a first network provider. Originating user device 105-1, originating content device 110-1, and originating messaging device 110-2 may be associated with a second network provider. For example, terminating user device 105-2, terminating content device 115-1, and terminating messaging device 115-2 may be included in a first network of the first network provider and originating user device 105-1, originating content device 110-1, originating messaging device 110-2 may be included in a second network of the second network provider. Third-party content device 120-1 and third-party messaging device 120-2 may be associated with a third-party provider. Third-party content device 120-1 and third-party messaging device 120-2 may be included in a third network of the third-party provider. In some implementations, the terminating content device 115-1 may use the file location records based on agreements between network providers. For example, the agreements may include an agreement between the second network provider (e.g., the second network or originating network) and the first network provider (e.g., the first network or terminating network) to use file location records to resolve the URL. The agreements may further include an agreement between the second network provider (e.g., the second network or originating network) and the third-party provider (or hub provider) to agree on the third-party provider S records or additional file location records.

Originating user device 105-1 may be configured to execute a first messaging application that enables originating user device 105-1 to communicate with terminating user device 105-2 via one or more messages. In some examples, the first messaging application may include a first RCS application. The first RCS application may be an application that provides RCS messaging functionality on originating user device 105-1.

The RCS messaging functionality may include, for example, sending, receiving, displaying, and/or interacting with text-based messages, images, video messages, audio messages, attachments, interactive objects, among other examples. Terminating user device 105-2 may be configured to execute a second messaging application that enables terminating user device 105-2 to communicate with originating user device 105-1 via one or more messages. In some examples, the second messaging application may include a second RCS application similar to the first RCS application.

Originating messaging device 110-2 may include one or more devices that are capable of receiving, generating, storing, processing, and/or providing information associated with the first messaging application. For example, originating messaging device 110-2 may be configured to facilitate the exchange of messages between originating user device 105-1 and terminating user device 105-2 (e.g., the exchange of RCS messages between originating user device 105-1 and terminating user device 105-2).

Originating content device 110-1 may include one or more devices that are capable of receiving, generating, storing, processing, and/or providing information regarding files that are to be transferred between originating user device 105-1 and terminating user device 105-2. For example, originating content device 110-1 may store the files that are to be transferred and may generate and provide file location information identifying locations of the files.

Terminating messaging device 115-2 may include one or more devices that are capable of receiving, generating, storing, processing, and/or providing information associated with the second messaging application. For example, terminating messaging device 115-2 may be configured to facilitate the exchange of messages between originating user device 105-1 and terminating user device 105-2 (e.g., the exchange of RCS messages between originating user device 105-1 and terminating user device 105-2). Terminating content device 115-1 may include one or more devices that are capable of receiving, generating, storing, processing, and/or providing information regarding the files that are to be transferred between originating user device 105-1 and terminating user device 105-2. For example, terminating content device 115-1 may store the files that are to be transferred and may generate and provide file location information identifying locations of the files.

Third-party messaging device 120-2 may include one or more devices that are capable of receiving, generating, storing, processing, and/or providing information associated with RCS messaging applications. For example, terminating messaging device 115-2 may be configured to facilitate the exchange of RCS messages between originating user device 105-1 and terminating user device 105-2. Third-party content device 120-1 may include one or more devices that are capable of receiving, generating, storing, processing, and/or providing information regarding files that are to be transferred between originating user device 105-1 and terminating user device 105-2. For example, third-party content device 120-1 may store the files that are to be transferred and may generate and provide file location information identifying locations of the files. The files may be transferred as part of the exchange of RCS messages.

In some examples, third-party messaging device 120-2 may be implemented as an RCS message hub and third-party content device 120-1 may be implemented as an RCS content hub. For example, in instances where the first network provider is associated with a first country and the second network provider is associated with a second country different than the first country, messages and files may be transmitted between originating user device 105-1 and terminating user device 105-2 via third-party messaging device 120-2 and third-party content device 120-1.

In the example that follows, originating user device 105-1 is to engage in a communication session (e.g., an RCS messaging session) with terminating user device 105-2 and is to transfer a file to terminating user device 105-2 as part of the communication session. The file may include a text file, an image file, a video file, among other examples. Terminating user device 105-2 may be executing the first RCS application and that originating user device 105-1 may be executing the second RCS application.

As shown in FIG. 1A, originating user device 105-1 (e.g., via the first RCS application) may provide the file to originating content device 110-1 to be uploaded. For example, originating user device 105-1 may provide the file via a Hypertext Transfer Protocol Secure (HTTPS) POST request. Originating content device 110-1 may receive the file and successfully upload the file. Accordingly, originating content device 110-1 may generate file location information identifying a location of the file (e.g., the location with respect to originating content device 110-1).

The file location information may include a Uniform Resource Identifier (URI), such as a Uniform Resource Locator (URL) that identifies a domain name associated with the first network provider. As show in FIG. 1A, originating content device 110-1 may provide a message including the file location information and originating user device 105-1 may receive the message. For example, originating content device 110-1 may provide a 200 OK message that includes the file location information and that indicates that the file has been successfully uploaded.

As explained above, typically, originating content device 110-1 would generate one file location information when the file is to be stored by originating content device 110-1 or another file location information when the file is to be stored by third-party content device 120-1. For example, originating content device 110-1 would generate one URL that may be used to obtain the file from originating content device 110-1 via the direct NNI file transfer and another URL that may be used to obtain the file from third-party content device 120-1 via the indirect NNI file transfer. Generating different URLs in this manner wastes computing resources, network resources, and other resources.

As explained herein, originating content device 110-1 generates the file location information (e.g., a single file location information) identifying the location of the file, irrespective of whether the file is to be stored by originating content device 110-1 or stored by third-party content device 120-1. For example, originating content device 110-1 may generate a single URL identifying the location of the file as originating content device 110-1, thereby preserving computing resources, network resources, and other resources that would have been used to generate different URLs.

As shown in FIG. 1A, based on receiving the message from originating content device 110-1, originating user device 105-1 (e.g., via the first RCS application) may provide messages to originating messaging device 110-2. For example, originating user device 105-1 may provide a session initiation protocol (SIP) message and a Message Session Relay Protocol (MSRP) message to originating messaging device 110-2. For instance, originating user device 105-1 may provide a SIP invite message indicating that originating user device 105-1 is requesting to establish the communication session with terminating user device 105-2.

When originating user device 105-1 receives a SIP 200 OK message from terminating user device 105-2, the communication session may be established. In some implementations, the SIP invite message may additionally indicate that originating user device 105-1 is requesting to transfer the file to terminating user device 105-2. The MSRP message may include the file location information.

In some implementations, originating messaging device 110-2 may determine whether the SIP invite message and the MSRP message are to be provided directly to terminating messaging device 115-2 or whether the SIP invite message and the MSRP message are to be provided indirectly to terminating messaging device 115-2 via third-party messaging device 120-2. In some implementations, the SIP invite message is routed based on an agreement between the originating network provider and the terminating network provider.

If the originating network provider and the terminating network provider are directly peering (e.g., direct connections exist between the originating network provider and the terminating network provider), then the SIP invite message is sent directly to the first network (or terminating network). Alternatively, if the originating network provider and the terminating network provider are not directly peering and are going through the third-party provider (e.g., a HUB provider), then the SIP invite message is routed through the third-party provider HUB. Once an end-to-end SIP connection is setup, then the MSRP message (e.g., an MSRP session message) is setup. The MSRP message contains the URL for the file to be transferred. The URL is provided to the terminating content device 115-1 on the terminating network. This URL is used with the file location record for determining the location of the file (e.g., for determining whether the file is located on the third-party content device or on originating content device 110-1 (e.g., the originating network server)).

In some implementations, the second network operator may cause one or more file location records to be generated based on originating user device 105-1 providing the messages, and/or based on originating messaging device 110-2 providing the SIP invite message and the MSRP message (e.g., to terminating messaging device 115-2 or to terminating messaging device 115-2 via third-party messaging device 120-2). The one or more file location records may be generated by a device included in the second network (of the second network operator), such as originating messaging device 110-2 and/or another device associated with the second network operator.

The one or more file location records may include information that may be used by terminating content device 115-1 to obtain the file, as explained in more detail below. For example, one file location record may include a service field that includes information indicating the direct NNI file transfer (e.g., if the file is stored by originating content device 110-1). Additionally, the one file location record may include the domain name associated with the second network operator if the file is to be obtained via the direct NNI file transfer.

Another file location record may include a service field that includes information indicating the indirect NM file transfer (e.g., if the file is stored by third-party content device 120-1). Additionally, the other file location record may include a domain name associated with third-party content device 120-1 if the file is to be obtained via the indirect NNI file transfer. In some implementations, the information that may be used by terminating content device 115-1 to obtain the file may be determined based on a result of analyzing the SIP invite message, as explained above.

Figure 1B:
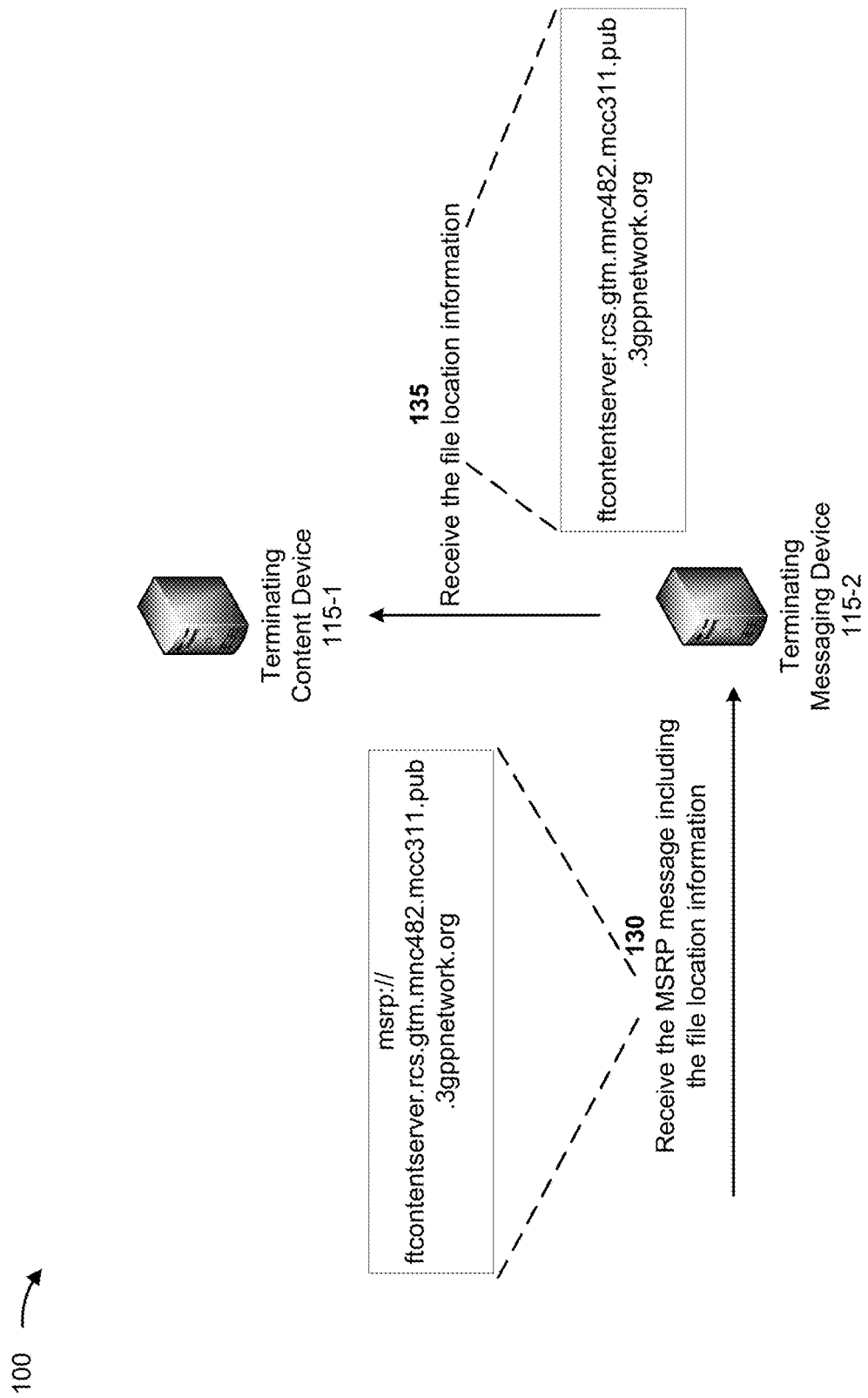

As shown in FIG. 1B, and by reference number 130, terminating messaging device 115-2 may receive the MSRP message including the file location information. Terminating messaging device 115-2 may receive the MSRP message from originating messaging device 110-2 (e.g., if the file is to be obtained via the direct NNI file transfer). Alternatively, terminating messaging device 115-2 may receive the MSRP message from third-party messaging device 120-2 (e.g., if the file is to be obtained via the indirect NNI file transfer). Terminating messaging device 115-2 may obtain the file location information from the MSRP message and provide the file location information to terminating content device 115-1.

As shown in FIG. 1B, and by reference number 135, terminating content device 115-1 may receive the file location information. For example, terminating content device 115-1 may receive the file location information from terminating messaging device 115-2. As explained above, the file location information may include the URL that identifies the domain name associated with the second network provider. In some implementations, terminating content device 115-1 may analyze the URL to identify the domain name associated with the second network provider. Terminating content device 115-1 may analyze the URL using one or more data processing techniques. As an example, terminating content device 115-1 may use a regular expression technique to identify the domain name.

Figure 1C:
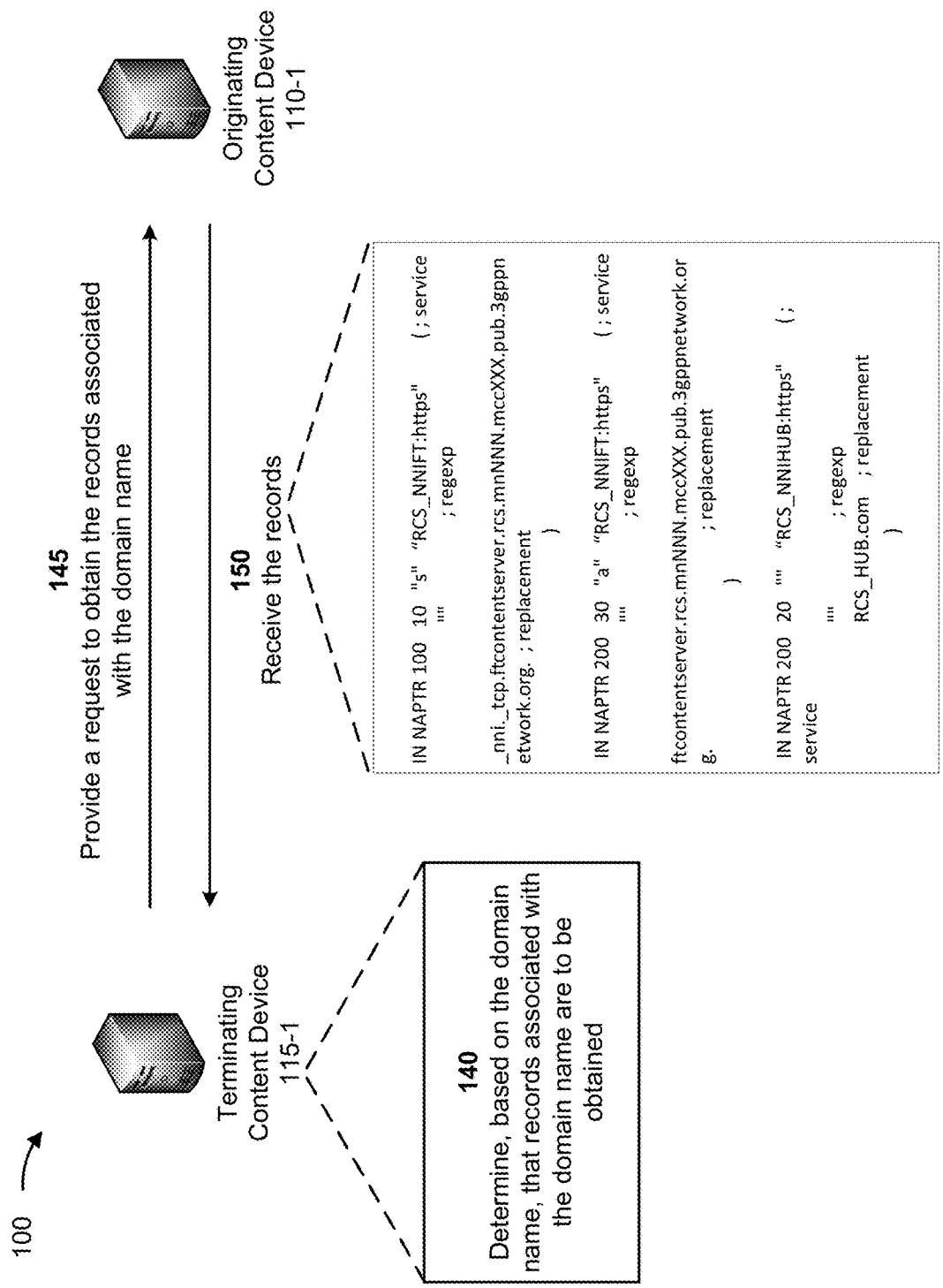

As shown in FIG. 1C, and by reference number 140, terminating content device 115-1 may determine, based on the domain name, that records associated with the domain name are to be obtained. For example, after identifying the domain name associated with the second network provider, terminating content device 115-1 may analyze the domain name to determine a manner in which the file is to be obtained. For example, terminating content device 115-1 may compare the domain name (included in the URL) and the domain name associated with the first network provider (with which terminating content device 115-1 is associated).

Based on the comparison, terminating content device 115-1 may determine that the domain name associated with the second network provider is different than the domain name associated with the first network provider. Terminating content device 115-1 may be configured to determine that file location records (associated with the domain name associated with the second network provider) are to be obtained when the domain name associated with the second network provider is different than the domain name associated with the first network provider. Accordingly, terminating content device 115-1 may determine that the file location records are to be obtained in order to determine the manner in which the file is to be obtained.

As shown in FIG. 1C, and by reference number 145, terminating content device 115-1 may provide a request to obtain the records associated with the domain name (associated with the second network provider). For example, based on determining that the file location records are to be obtained, terminating content device 115-1 may provide the request to obtain the file location records associated with the domain name associated with the second network provider. In some implementations, terminating content device 115-1 may provide the request to originating content device 110-1 based on the URL identifying the domain name associated with the second network provider. Additionally, or alternatively, terminating content device 115-1 may provide the request to another device associated with the second network provider, such as originating messaging device 110-2.

As shown in FIG. 1C, and by reference number 150, terminating content device 115-1 may receive the records. For example, terminating content device 115-1 may receive the file location records from originating content device 110-1 (and/or from another device associated with the second network provider), based on providing the request. In some implementations, the file location records may include NAPTR records.

As shown in FIG. 1C, the first NAPTR record includes an order value of 100, a preference value of 10, a flag value of "S," a service field of "RCS_NNIFT:https," and information identifying the domain name associated with the second network provider. The flag value of "S" may be used to indicate that a network address and a port number of originating content device 110-1 may be obtained using the first NAPTR record. The service field of "RCS_NNIFT: https" may indicate the direct NNI file transfer.

The second NAPTR record includes an order value of 200, a preference value of 30, a flag value of "a," the service field of "RCS_NNIFT:https," and information identifying the domain name associated with the second network provider. The flag value of "a" may be used to indicate that the network address of originating content device 110-1 may be obtained using the second NAPTR record.

The third NAPTR record includes an order value of 200, a preference value of 20, a service field of "RCS_NNIHUB: https," and information identifying a domain name associated with the third-party provider. The service field of "RCS_NNIHUB:https" indicates the indirect NNI file transfer. The third NAPTR may be used to obtain a network address associated with third-party content device 120-1.

The first NAPTR record and the second NAPTR record may indicate that the file is to be obtained via the direct NNI file transfer. The third NAPTR record may indicate that the file is to be obtained via the indirect NNI file transfer. The NAPTR records and information included in the NAPTR records are merely provided as examples. In practice, different NAPTR records and different information may be used in different situations. As explained above, the NAPTR records may be generated by a device associated with the second network provider. The information identifying the domain name associated with third-party content device 120-1 may be obtained from a device associated with the third-party provider.

Figure 1D:
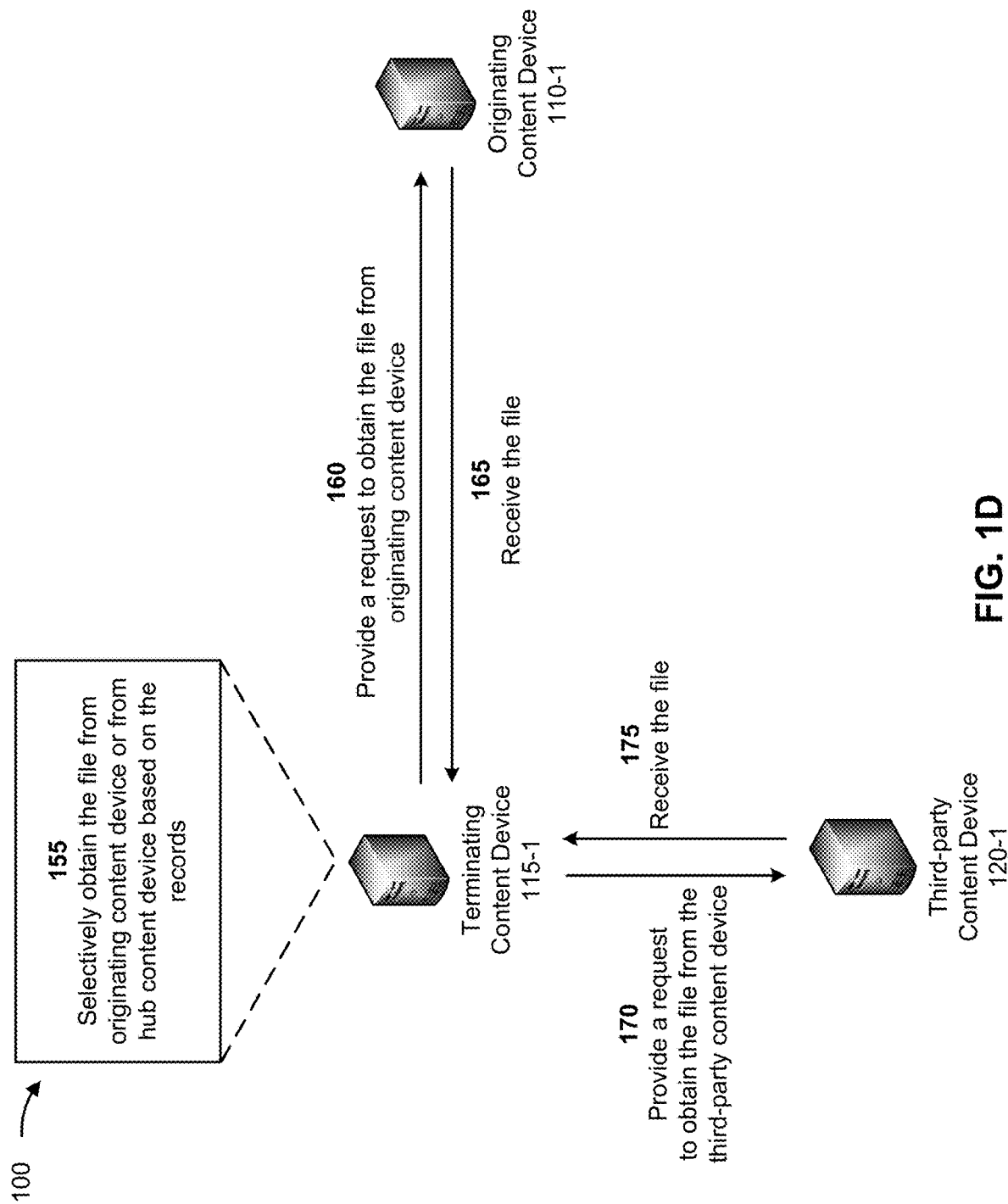

As shown in FIG. 1D, and by reference number 155, terminating content device 115-1 may selectively obtain the file from originating content device 110-1 or from third-party content device 120-1 based on the records. For example, terminating content device 115-1 may determine whether the file is to be obtained via the direct NNI file transfer or via the indirect NNI file transfer based on the file location records. Assume that the file location records are NAPTR records and that terminating content device 115-1 has been configured to analyze the NAPTR records to identify information indicating the direct NNI file transfer or information indicating the indirect NM file transfer.

For example, assume that terminating content device 115-1 has been configured to determine that the service field of "RCS_NNIFT:https" indicates the direct NM file transfer and that the service field of "RCS_NNIHUB:https" indicates the indirect NNI file transfer. In this regard, based on analyzing the NAPTR records, terminating content device 115-1 may determine that the first NAPTR record and the second NAPTR record indicate that the file is to be obtained via the direct NM file transfer while the third NAPTR record indicates that the file is to be obtained via the indirect NNI file transfer.

In some implementations, terminating content device 115-1 may determine whether the MSRP message was received from originating messaging device 110-2 or from third-party messaging device 120-2. Assume that terminating content device 115-1 determines that the MSRP message was received from originating messaging device 110-2. In some implementations, based on determining that the MSRP message was received from originating messaging device 110-2, terminating content device 115-1 may determine that the file is to be obtained via the direct NNI file transfer. Accordingly, terminating content device 115-1 may search the NAPTR records to identify one or more NAPTR records that include the service field of "RCS_NNIFT:https." In this regard, terminating content device 115-1 may identify the first NAPTR record and the second NAPTR record and determine to obtain the file via the direct NNI file transfer using the first NAPTR record or using the second NAPTR record.

In some situations, the NAPTR records may be ranked based on the order values of NAPTR records. For example, the NAPTR records may be ranked in an ascending order of the order values. The NAPTR records may be further ranked based on the preference values of the NAPTR records. For example, NAPTR records of a same order value may be ranked in an ascending order of the preference values. Assume the first NAPTR record is ranked higher than the second NAPTR record, terminating content device 115-1 may first attempt to obtain the file based on the first NAPTR record.

In some implementations, terminating content device 115-1 may obtain the network address and the port number of originating content device 110-1 using the first NAPTR record and provide a request for the file using the network address and the port number. If terminating content device 115-1 is unable to obtain the file based on the first NAPTR record, terminating content device 115-1 may attempt to obtain the file based on the second NAPTR record. In some implementations, terminating content device 115-1 may obtain the network address of originating content device 110-1 using the second NAPTR record and provide a request for the file using the network address.

Assume that terminating content device 115-1 determine that the MSRP message was received from third-party messaging device 120-2. In some implementations, based on determining that the MSRP message was received from third-party messaging device 120-2, terminating content device 115-1 may determine that the file is to be obtained via the indirect NNI file transfer. Accordingly, terminating content device 115-1 may search the NAPTR records to identify one or more NAPTR records that include the service field of "RCS_NNIHUB:https."

In this regard, terminating content device 115-1 may identify the third NAPTR record and determine to obtain the file via the indirect NNI file transfer based on the third NAPTR record. In some implementations, terminating content device 115-1 may obtain the network address of third-party content device 120-1 using the third NAPTR record and provide a request for the file using the network address of third-party content device 120-1.

In some implementations, the NAPTR records may be ranked as explained above and terminating content device 115-1 may use the ranked NAPTR records to obtain the file (without determining whether the MSRP message was received from originating messaging device 110-2 or from third-party messaging device 120-2). For example, terminating content device 115-1 may first attempt to obtain the file based on a first ranked NAPTR record, in a manner similar to the manner described above. If the attempt is unsuccessful, terminating content device 115-1 may then attempt to obtain the file based on a second ranked NAPTR record, a third ranked NAPTR record, and so on, until the file is successfully obtained.

As shown in FIG. 1D, and by reference number 160, terminating content device 115-1 may provide a request to obtain the file from originating content device 110-1. For example, assume that terminating content device 115-1 determines that the file is to be obtained via the direct NNI file transfer, as explained above. Terminating content device 115-1 may provide the request to originating content device 110-1 to obtain the file, as explained above. For example, terminating content device 115-1 may provide a HTTP GET message that includes the URL identifying the location of the file.

As shown in FIG. 1D, and by reference number 165, terminating content device 115-1 may receive the file from originating content device 110-1. For example, assume that originating content device 110-1 receives the request, that originating content device 110-1 is storing the file, and that originating content device 110-1 properly authenticates terminating content device 115-1. Originating content device 110-1 may provide a message that includes the file. For example, originating content device 110-1 may provide a 200 OK message that includes the file. Terminating content device 115-1 may receive the message and the file from originating content device 110-1.

As shown in FIG. 1D, and by reference number 170, originating content device 110-1 may provide a request to obtain the file from third-party content device 120-1. Assume that terminating content device 115-1 determines that the file is to be obtained via the indirect NNI file transfer, as explained above. Terminating content device 115-1 may provide the request to third-party content device 120-1 to obtain the file. For example, terminating content device 115-1 may provide a HTTP GET message that includes the URL identifying the location of the file.

As shown in FIG. 1D, and by reference number 175, terminating content device 115-1 may receive the file from third-party content device 120-1. Assume that originating messaging device 110-2 previously provided the MSRP message and the SIP invite message to third-party messaging device 120-2. In some implementations, third-party messaging device 120-2 may provide the file location information to third-party content device 120-1 to cause third-party content device 120-1 to request the file from originating content device 110-1. For example, third-party content device 120-1 may use the file location information to request the file from originating content device 110-1.

Third-party content device 120-1 may receive the file from originating content device 110-1 and store the file. The file, received from originating content device 110-1, may be associated with a name and the domain name associated with the second network provider. In some implementations, third-party content device 120-1 may cause the file to be stored using the same name and domain name.

After storing the file, third-party content device 120-1 may receive the request and may identify the file based on the domain name (included in the request) matching the domain name of the file stored by third-party content device 120-1. After properly authenticating terminating content device 115-1, third-party content device 120-1 may provide a message that includes the file. For example, third-party content device 120-1 may provide a 200 OK message that includes the file. Terminating content device 115-1 may receive the message and the file from third-party content device 120-1 and may store the file.

Figure 1E:
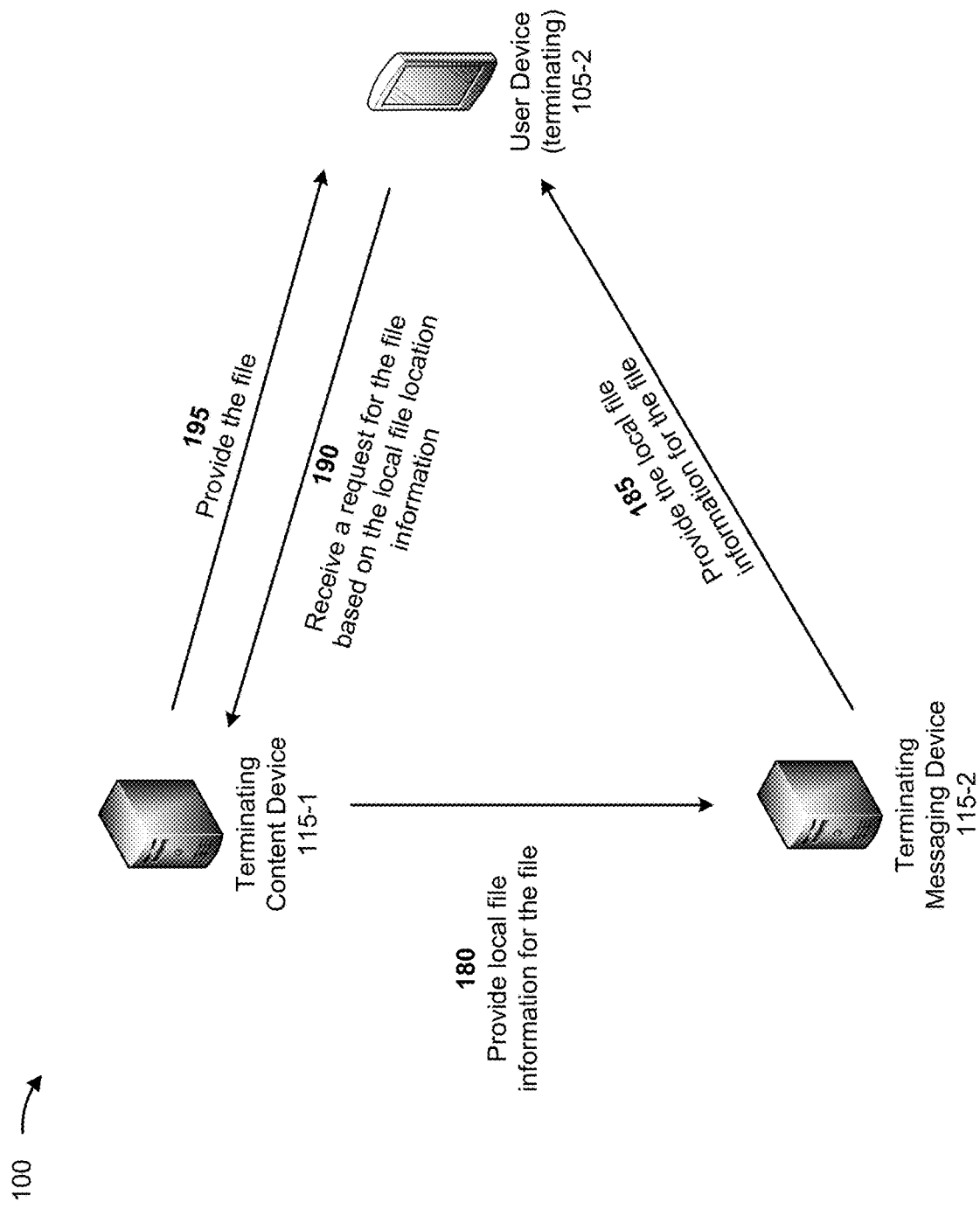

As shown in FIG. 1E, and by reference number 180, terminating content device 115-1 may provide local file location information for the file. For example, assume that terminating content device 115-1 has obtained the file from originating content device 110-1 or from third-party content device 120-1. Terminating content device 115-1 may store the file and generate the local file information identifying a location of the file in terminating content device 115-1. In some implementations, the local file information may be a URL identifying a location of the file in terminating content device 115-1. Terminating content device 115-1 may provide the local file information to terminating messaging device 115-2.

As shown in FIG. 1E, and by reference number 185, terminating messaging device 115-2 may provide the local file information to terminating user device 105-2. For example, terminating messaging device 115-2 may receive the local file information from terminating content device 115-1 and provide the local file information to terminating user device 105-2.

As shown in FIG. 1E, and by reference number 190, terminating content device 115-1 may receive a request for the file based on the local file information. For example, terminating content device 115-1 may receive a HTTPS GET message from terminating user device 105-2. The HTTPS GET message may include the local file information.

As shown in FIG. 1E, and by reference number 195, terminating content device 115-1 may provide the file to terminating user device 105-2. For example, based on receiving the HTTPS GET message and the local file information, terminating content device 115-1 may obtain the file from the location identified by the local file information. Terminating content device 115-1 may provide the file to terminating user device 105-2.

As explained herein, based on information included in the NAPTR records, terminating content device 115-1 may determine whether the file is to be obtained via the direct NNI file transfer or via the indirect NNI file transfer. Using the NAPTR records in this manner preserves computing resources, network resources, and other resources that would have otherwise been used by originating content device 110-1 to generate different URLs for different locations of the file.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
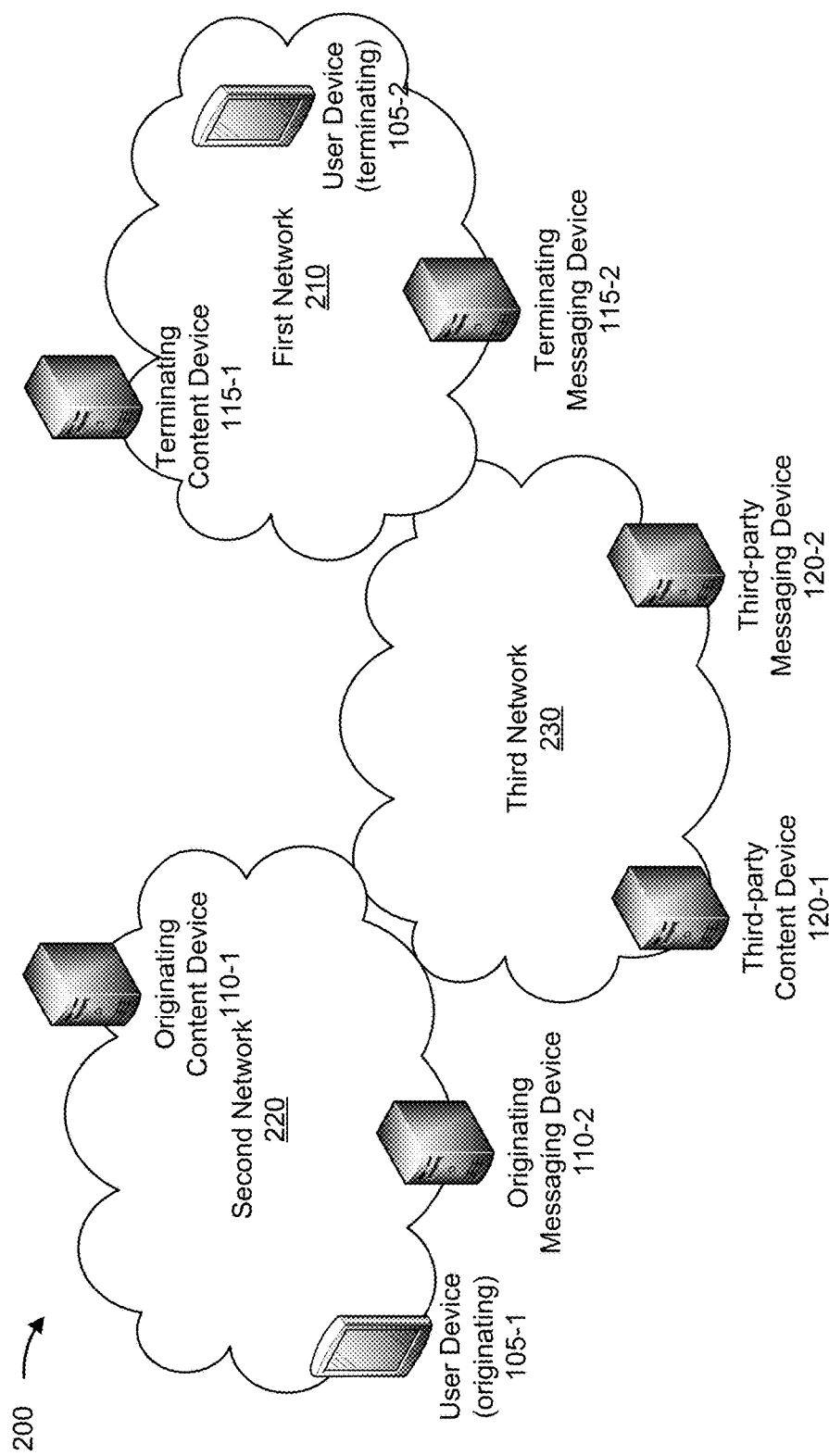
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include originating user device 105-1, terminating user device 105-2, originating content device 110-1, originating messaging device 110-2, terminating content device 115-1, terminating messaging device 115-2, third-party content device 120-1, and third-party messaging device 120-2. Originating user device 105-1, terminating user device 105-2, originating content device 110-1, originating messaging device 110-2, terminating content device 115-1, terminating messaging device 115-2, third-party content device 120-1, and third-party messaging device 120-2 have been described above in connection with FIG. 1. Terminating user device 105-2, terminating content device 115-1, and terminating messaging device 115-2 may be included in a first network 210 of the first network provider. Originating user device 105-1, originating content device 110-1, originating messaging device 110-2 may be included in a second network 220 of the second network provider. Third-party content device 120-1 and third-party messaging device 120-2 may be included in a third network 230 of the third-party provider.

Originating user device 105-1 may include a communication device and a computing device. For example, originating user device 105-1 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. Terminating user device 105-2 may be similar to originating user device 105-1.

Originating content device 110-1 may include a communication device and a computing device. For example, originating content device 110-1 may include a server, such as an application server, a client server, a web server, a database server, a host server, a proxy server, a virtual server (e.g., executing on computing hardware), or a server in a cloud computing system. In some implementations, originating content device 110-1 includes computing hardware used in a cloud computing environment. Terminating content device 115-1 and third-party content device 120-1 may be similar to originating content device 110-1.

Originating messaging device 110-2 may include a communication device and a computing device. For example, originating messaging device 110-2 may include a server, such as an application server, a client server, a web server, a database server, a host server, a proxy server, a virtual server (e.g., executing on computing hardware), or a server in a cloud computing system. In some implementations, originating content device 110-1 includes computing hardware used in a cloud computing environment. Terminating messaging device 115-2 and third-party messaging device 120-2 may be similar to originating messaging device 110-2.

First network 210 includes one or more wired and/or wireless networks. For example, first network 210 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. First network 210 enables communication among the devices of environment 200.

Second network 220 and third network 230 may be similar to first network 210. In some examples, third network 230 may be implemented as a network that provides an interconnection service between first network 210 and second network 220.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
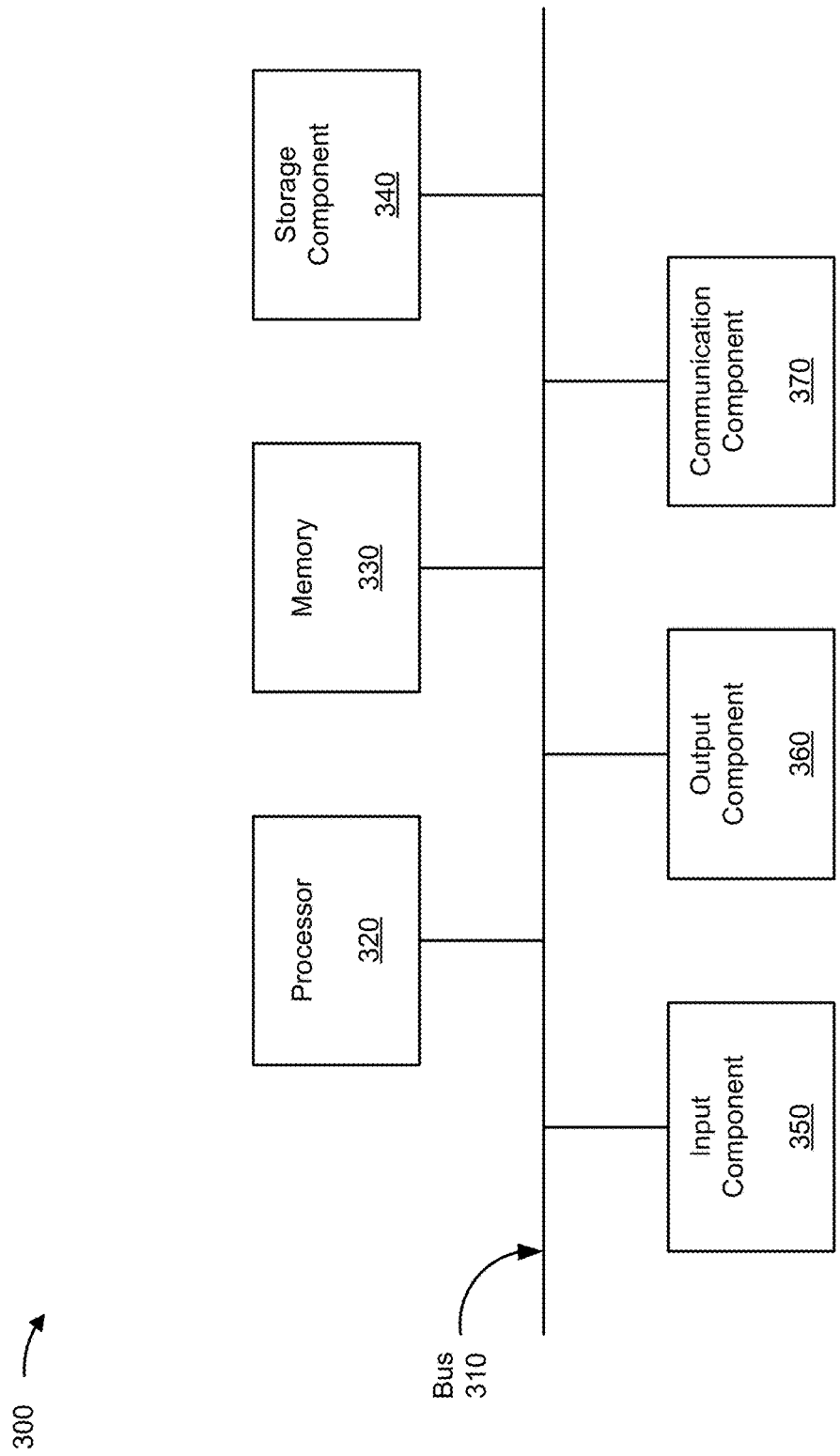
FIG. 3 is a diagram of example components of one or more devices of FIG. 2.

FIG. 3 is a diagram of example components of a device 300, which may correspond to originating user device 105-1, terminating user device 105-2, originating content device 110-1, originating messaging device 110-2, terminating content device 115-1, terminating messaging device 115-2, third-party content device 120-1, and third-party messaging device 120-2. In some implementations, originating user device 105-1, terminating user device 105-2, originating content device 110-1, originating messaging device 110-2, terminating content device 115-1, terminating messaging device 115-2, third-party content device 120-1, and third-party messaging device 120-2 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 relating to selectively obtaining a file via a direct file transfer or an indirect file transfer. In some implementations, one or more process blocks of FIG. 4 may be performed by a terminating content device (e.g., terminating content device 115-1). In some implementations, one or more process blocks of FIG. 4 may be performed by another device or a group of devices separate from or including the terminating content device, such as an originating user device (e.g., originating user device 105-1), a terminating user device (e.g., terminating user device 105-2), an originating content device (e.g., originating content device 110-1), an originating messaging device (e.g., originating messaging device 110-2), a terminating messaging device (e.g., terminating messaging device 115-2), a third-party content device (e.g., third-party content device 120-1), and a third-party messaging device (e.g., third-party messaging device 120-2). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving file location information identifying a file to be transferred to a user device associated with the first network provider (block 410). For example, the terminating content device may receive file location information identifying a file to be transferred to a user device associated with the first network provider, wherein the file location information identifies a domain name associated with a second network provider, as described above. In some implementations, the file location information identifies a domain name associated with a second network provider. In some implementations, receiving the file location information includes receiving the file location information via a Message Session Relay Protocol (MSRP) message.

As further shown in FIG. 4, process 400 may include providing, based on the file location information, a request to obtain one or more records associated with the domain name (block 420). For example, the terminating content device may provide, based on the file location information, a request to obtain one or more records associated with the domain name, as described above.

In some implementations, process 400 includes determining, based on the domain name, that the one or more records are to be obtained in order to obtain the file, and wherein providing the request to obtain the one or more records includes providing the request to obtain the one or more records based on determining that the one or more records are to be obtained in order to obtain the file.

As further shown in FIG. 4, process 400 may include receiving the one or more records based on the request (block 430). For example, the terminating content device may receive the one or more records based on the request, as described above.

In some implementations, receiving the one or more records includes receiving one or more Name Authority Pointer (NAPTR) records.

In some implementations, the one or more NAPTR records are sorted based on order values of the one or more NAPTR records, wherein the method further comprises analyzing the one or more NAPTR records sorted based on the order values, and selectively obtaining the file from the first content device or from the second content device includes selectively obtaining the file from the first content device or from the second content device based on analyzing the one or more NAPTR records. The one or more NAPTR records may be sorted based on the order value field so that the terminating content device may decide which record to use first to locate the file.

As further shown in FIG. 4, process 400 may include selectively obtaining, based on the one or more records, the file from a first content device associated with the second network provider or from a second content device associated with a third-party provider (block 440). For example, the terminating content device may selectively obtain, based on the one or more records, the file from a first content device associated with the second network provider or from a second content device associated with a third-party provider, as described above.

In some implementations, obtaining the file from the first content device includes obtaining the file by way of a direct network-to-network interface (NNI) file transfer.

In some implementations, obtaining the file from the second content device includes obtaining the file by way of an indirect network-to-network interface (NNI) file transfer.

As further shown in FIG. 4, process 400 may include providing the file to the user device (block 450). For example, the terminating content device may provide the file to the user device, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a first device of a first network provider, file location information identifying a file to be transferred to a user device associated with the first network provider,
        wherein the file location information identifies a domain name associated with a second network provider;
    providing, by the first device and based on the file location information, a request to obtain one or more records associated with the domain name;
    receiving, by the first device, the one or more records based on the request,
        wherein receiving the one or more records includes receiving one or more naming records;
    analyzing, by the first device, the one or more records when the one or more records are sorted based on order values;
    selectively obtaining, by the first device and based on the one or more records, the file from a first content device associated with the second network provider or from a second content device associated with a third-party provider based on analyzing the order values; and
    providing, by the first device, the file to the user device.

2. The method of claim 1, wherein receiving the file location information includes:
    receiving the file location information via a Message Session Relay Protocol (MSRP) message.

3. The method of claim 1, further comprising:
    determining, based on the domain name, that the one or more records are to be obtained in order to obtain the file; and
    wherein providing the request to obtain the one or more records includes:
        providing the request to obtain the one or more records based on determining that the one or more records are to be obtained in order to obtain the file.

4. The method of claim 1, wherein receiving the one or more records includes:
    receiving one or more Name Authority Pointer (NAPTR) records.

5. The method of claim 4,
    wherein the order values are order values of the one or more NAPTR records, and
    wherein the one or more NAPTR records are sorted based on the order values;
    wherein the method further comprises:
        analyzing the one or more NAPTR records sorted based on the order values; and
    wherein selectively obtaining the file from the first content device or from the second content device includes:
        selectively obtaining the file from the first content device or from the second content device based on analyzing the one or more NAPTR records.

6. The method of claim 1, wherein obtaining the file from the first content device includes:
    obtaining the file by way of a direct network-to-network interface (NNI) file transfer.

7. The method of claim 6, wherein obtaining the file from the second content device includes:
    obtaining the file by way of an indirect network-to-network interface (NNI) file transfer.

8. A device, comprising:
one or more processors configured to:
receive information regarding a file to be transferred to a user device associated with a first network provider,
wherein the device is associated with the first network provider;
determine, based on a domain name identified by the information, that one or more records, associated with the domain name, are to be obtained in order to determine a manner in which the file is to be obtained,
wherein the domain name is associated with a second network provider;
provide a request to obtain the one or more records based on determining that the one or more records are to be obtained in order to determine the manner in which the file is to be obtained;
analyze the one or more records when the one or more records are sorted based on order values;
receive the one or more records based on providing the request,
wherein the one or more processors, to receive the one or more records, are configured to receive one or more naming records;
selectively obtain, based on the one or more records, the file from a first content device associated with the second network provider or from a second content device associated with a third-party provider based on analyzing the order values; and
provide the file to the user device.

9. The device of claim 8, wherein the second content device is a Rich Communication Services (RCS) hub.

10. The device of claim 8, wherein the one or more processors are further configured to:
analyze one or more fields of the one or more records; and
wherein, to selectively obtain the file from the first content device or from the second content device, the one or more processors are further configured to:
selectively obtain the file from the first content device or from the second content device based on analyzing the one or more fields.

11. The device of claim 8, wherein the domain name is a first domain name, and
wherein the one or more processors, to determine that the one or more records are to be obtained, are configured to:
determine that the first domain name is different than a second domain name associated with the first network provider; and
determine that the one or more records are to be obtained based on determining that the first domain name is different than the second domain name.

12. The device of claim 8, wherein the one or more records are sorted based on the order values and further sorted based on a preference value of the order value; and
wherein, to selectively obtain the file from the first content device or from the second content device, the one or more processors are configured to:
selectively obtain the file from the first content device or from the second content device based on analyzing the one or more records.

13. The device of claim 8, wherein, to obtain the file from the first content device, the one or more processors are configured to:
obtain the file by way of a direct network-to-network interface (NNI) file transfer; and
wherein, to obtain the file from the second content device, the one or more processors are configured to:
obtain the file by way of an indirect network-to-network interface (NNI) file transfer.

14. The device of claim 8, wherein, to receive the one or more records, the one or more processors are configured to:
receive one or more Name Authority Pointer (NAPTR) records.

15. A non-transitory computer-readable medium storing a set of instructions, the set of instructions comprising:
one or more instructions that, when executed by one or more processors of a device, cause the device to:
receive file location information identifying a location of a file to be transferred to a user device associated with a first network provider,
wherein the device is associated with the first network provider;
determine, based on a domain name identified in the file location information, that one or more records, associated with the domain name, are to be obtained,
wherein the domain name is associated with a second network provider;
provide a records request to obtain the one or more records based on determining that the one or more records are to be obtained;
receive the one or more records based on providing the records request,
wherein the one or more instructions, that cause the one or more processors to receive the one or more records, cause the one or more processors receive one or more naming records;
analyze the one or more records when the one or more records are sorted based on order values;
selectively obtain, based on the one or more records, the file from a first content device associated with the second network provider or from a second content device associated with a third-party provider based on analyzing the order values; and
provide the file to the user device.

16. The non-transitory computer-readable medium of claim 15, wherein the one or more instructions, when executed by the one or more processors, further cause the device to:
analyze a service field of the one or more records; and
wherein the one or more instructions, that cause the device to selectively obtain the file from the first content device or from the second content device, cause the device to:
selectively obtain the file from the first content device or from the second content device based on analyzing the service field of the one or more records.

17. The non-transitory computer-readable medium of claim 15, wherein the one or more records are sorted based on the order values; and
wherein the one or more instructions, that cause the device to obtain the file from the first content device or from the second content device, cause the device to:
selectively obtain the file from the first content device or from the second content device based on analyzing the one or more records.

18. The non-transitory computer-readable medium of claim 15, wherein the one or more instructions, that cause the device to obtain the file from the first content device, further cause the device to:
obtain the file by way of a direct network-to-network interface (NNI) file transfer; and wherein the one or more instructions, that cause the device to obtain the file from the second content device, further cause the device to:

obtain the file by way of an indirect network-to-network interface (NNI) file transfer.

19. The non-transitory computer-readable medium of claim 18, wherein the second content device is a Rich Communication Services (RCS) content device.

20. The non-transitory computer-readable medium of claim 15, wherein the domain name is a first domain name, and wherein the one or more instructions, that cause the device to determine that the one or more records are to be obtained, further cause the device to:

determine that the first domain name is different than a second domain name associated with the first network provider; and determine that the one or more records are to be obtained based on determining that the first domain name is different than the second domain name.

* * * * *